United States Patent
Han et al.

(10) Patent No.: US 10,001,886 B2
(45) Date of Patent: Jun. 19, 2018

(54) DISPLAY DEVICE AND METHOD FOR DRIVING THE SAME DURING DISPLAY PERIOD AND TOUCH PERIOD OF DISPLAY DEVICE

(71) Applicant: LG Display Co., Ltd., Seoul (KR)

(72) Inventors: Sungsu Han, Goyang-si (KR); Suhyuk Jang, Paju-si (KR); Hoonbae Kim, Goyang-si (KR); Semin Kung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 4 days.

(21) Appl. No.: 14/457,813

(22) Filed: Aug. 12, 2014

(65) Prior Publication Data

US 2015/0103038 A1   Apr. 16, 2015

(30) Foreign Application Priority Data

Oct. 16, 2013  (KR) ........................ 10-2013-0123576

(51) Int. Cl.
  *G06F 3/041* (2006.01)
  *G09G 3/36* (2006.01)
  *G06F 3/044* (2006.01)

(52) U.S. Cl.
  CPC ............ *G06F 3/044* (2013.01); *G06F 3/0412* (2013.01); *G06F 3/0416* (2013.01); *G09G 3/3648* (2013.01); *G09G 3/3688* (2013.01); *G09G 2310/0297* (2013.01); *G09G 2370/10* (2013.01); *G09G 2370/14* (2013.01)

(58) Field of Classification Search
  CPC ...... G06F 3/044; G06F 3/0412; G06F 3/0416; G09G 3/3648; G09G 3/3688; G09G 2310/0297; G09G 2370/10; G09G 2370/14
  See application file for complete search history.

(56) References Cited

U.S. PATENT DOCUMENTS

| | | | |
|---|---|---|---|
| 7,898,518 | B2 | 3/2011 | Hong et al. |
| 7,948,465 | B2 | 5/2011 | Cho et al. |
| 8,330,699 | B2 | 12/2012 | Hong et al. |

(Continued)

FOREIGN PATENT DOCUMENTS

| | | |
|---|---|---|
| CN | 101751891 A | 6/2010 |
| JP | 2010-204667 A | 9/2010 |

(Continued)

OTHER PUBLICATIONS

European Patent Office, Search Report and Opinion, European Patent Application No. 14175354.1, dated Feb. 18, 2015, eight pages.

(Continued)

*Primary Examiner* — Kwang-Su Yang
(74) *Attorney, Agent, or Firm* — Fenwick & West LLP (57) ABSTRACT

A display device and a method for driving the same are discussed. The display device, in which pixels of a display panel are charged to a data voltage during a pixel driving period and touch sensors embedded in the display panel are driven during a touch sensor driving period, includes a timing controller which transmits a preamble signal, control data, and data of an input image to a source driver integrated circuit (IC) during the pixel driving period and transmits the preamble signal to the source driver IC during the touch sensor driving period.

20 Claims, 10 Drawing Sheets

(56) References Cited

U.S. PATENT DOCUMENTS

| | | | |
|---|---|---|---|
| 8,792,062 B2* | 7/2014 | Hwang | G06F 3/044 |
| | | | 178/18.01 |
| 8,933,898 B2* | 1/2015 | Lee | G06F 3/0412 |
| | | | 345/173 |
| 8,970,517 B2* | 3/2015 | Hwang | G06F 3/0418 |
| | | | 178/18.06 |
| 2011/0090193 A1* | 4/2011 | Imai | G01J 1/46 |
| | | | 345/207 |
| 2012/0242597 A1* | 9/2012 | Hwang | G06F 3/0412 |
| | | | 345/173 |
| 2013/0088477 A1 | 4/2013 | Seong et al. | |
| 2013/0222279 A1 | 8/2013 | Chang et al. | |
| 2014/0160066 A1 | 6/2014 | Kim et al. | |
| 2015/0130786 A1* | 5/2015 | Saitoh | G06F 3/041 |
| | | | 345/213 |

FOREIGN PATENT DOCUMENTS

| | | |
|---|---|---|
| JP | 2011-221487 A | 11/2011 |
| JP | 2012-203901 A | 10/2012 |
| TW | 201335809 A | 9/2013 |
| WO | WO 2010/038512 A1 | 4/2010 |

OTHER PUBLICATIONS

Chinese First Office Action, Chinese Application No. 201410359681.0, dated Jun. 20, 2016, 10 pages.

* cited by examiner

DISPLAY DEVICE AND METHOD FOR DRIVING THE SAME DURING DISPLAY PERIOD AND TOUCH PERIOD OF DISPLAY DEVICE

This application claims the benefit of Korean Patent Application No. 10-2013-0123576 filed on Oct. 16, 2013, the entire contents of which is incorporated herein by reference for all purposes.

BACKGROUND OF THE INVENTION

Field of the Invention

Embodiments of the invention relate to a display device and a method for driving the same.

Discussion of the Related Art

A flat panel display may be implemented as a liquid crystal display (LCD), an organic light emitting display, an electrophoresis display (EPD), and a plasma display panel (PDP).

An active matrix display device includes a thin film transistor (TFT) serving as a switching element in each pixel. A driving circuit of the display device applies an input image to the pixels. The driving circuit of the display device includes a data driving circuit outputting a data voltage, a gate driving circuit (or a scan driving circuit) outputting a gate pulse (or a scan pulse) synchronized with the data voltage, and a timing controller for controlling operation timings of the data driving circuit and the gate driving circuit. The data driving circuit may include a plurality of source driver integrated circuits (ICs). The gate driving circuit may include a plurality of gate driver ICs.

The timing controller supplies digital video data, clocks for sampling the digital video data, a control signal for controlling operations of the source driver ICs, etc. to the source driver ICs through a standard interface, for example, a mini low voltage differential signaling (LVDS) interface. The source driver ICs convert the digital video data received from the timing controller into an analog data voltage and supply the analog data voltage to data lines.

When the timing controller is connected to the source driver ICs in a multidrop manner through the mini LVDS interface, red (R) data transmission lines, green (G) data transmission lines, blue (B) data transmission lines, control lines for controlling operation timings of an output and a polarity conversion operation of the source driver ICs, clock transmission lines, etc. may be implemented between the timing controller and the source driver ICs. In the mini LVDS interface, RGB data, for example, RGB digital video data and a clock are transmitted via differential signal pair. In one example, when odd data and even data are simultaneously transmitted, at least 14 lines for the transmission of the RGB data are implemented between the timing controller and the source driver ICs. When the RGB data have 10 bits, 18 lines are implemented. Thus, multiple lines may be formed on a source printed circuit board (PCB) mounted between the timing controller and the source driver ICs. Hence, the source PCB is implemented with a large surface area to accommodate widths of the multiple lines.

A new signal transmission protocol (hereinafter referred to as "an EPI (clock embedded point-to-point) interface protocol"), which connects the timing controller with the source driver ICs in a point-to-point manner to minimize the number of lines between the timing controller and the source driver ICs and to stabilize the signal transmission, was disclosed in U.S. Pat. Nos. 7,898,518, 7,948,465, and 8,330, 699 corresponding to the present applicant, and which are hereby incorporated by reference in their entirety.

The EPI interface protocol has the following characteristics (1) to (3).

(1) A transmitting terminal of the timing controller is connected with receiving terminals of the source driver ICs via signal line pairs (hereinafter referred to as "EPI line pairs") without the line sharing in the point-to-point manner.

(2) Separate clock line pairs are not connected between the timing controller and the source driver ICs. The timing controller transmits a clock signal and digital data to the source driver ICs through the EPI line pairs. The digital data includes video data of an input image and control data for controlling the operations of the source driver ICs.

(3) A clock recovery circuit for clock and data recovery (CDR) is embedded in each of the source driver ICs. The timing controller transmits a clock training pattern signal, namely, a preamble signal to the source driver ICs, so that an output phase and an output frequency of the clock recovery circuit may be locked. The clock recovery circuit embedded in each source driver IC generates an internal clock in response to the preamble signal input through the EPI line pairs and locks a phase and a frequency of the internal clock.

When the phase and the frequency of the internal clock are locked, the source driver ICs indicate, with a lock signal, an output stabilization state to the timing controller. For example, the source driver IC generates a lock signal with a high logic level to indicate the output stabilization state to the timing controller.

As described above, in the EPI interface protocol, the timing controller transmits the preamble signal to the source driver ICs before transmitting the control data and the video data of the input image to the source driver ICs. The clock recovery circuit of the source driver IC performs a clock training operation in response to the preamble signal and stably locks the phase and the frequency of the internal clock. When the phase and the frequency of the internal clock are stably locked, a data link, to which the video data of the input image is transmitted, is formed between the source driver ICs and the timing controller. After the lock signal is received from the last source driver IC, the timing controller starts to transmit the video data and the control data to the source driver ICs.

When the output phase and the output frequency of the clock recovery circuit embedded in any one of the source driver ICs are unlocked, the source driver ICs indicate, with the lock signal, the output phase and the output frequency are unlocked. For example, the lock signal may be inverted to a low logic level. The last source driver IC transmits the lock signal of the low logic level to the timing controller. When the lock signal is inverted to the low logic level, the timing controller transmits the preamble signal to the source driver ICs and resumes the clock training operations of the source driver ICs.

In the display device, touch sensors may be embedded in a pixel array in an in-cell type, so as to implement a touch user interface (UI). When the touch sensors are embedded in the pixel array of the display device, a pixel driving period and a touch sensor driving period are time-divided so as to prevent interference between the touch sensors and pixels of the pixel array, because the touch sensors and the pixels are coupled through a parasitic capacitance. When a voltage of the pixel changes in the touch sensor driving period, the changed voltage of the pixel is applied to the touch sensor through the parasitic capacitance and thus generates a noise in an output of the touch sensor. However, the EPI interface protocol does not address a control method capable of preventing changes in the voltage of the pixel in the touch sensor driving period when the pixel driving period and the touch sensor driving period are time-divided.

SUMMARY OF THE INVENTION

Embodiments of the invention provide a display device and a method for driving the same capable of preventing changes in a voltage of a pixel in a touch sensor driving period in an EPI interface between a timing controller and source driver integrated circuits (ICs).

In one aspect, there is a display device, in which pixels of a display panel are charged to a data voltage during a pixel driving period and touch sensors embedded in the display panel are driven during a touch sensor driving period, comprising a timing controller configured to transmit a preamble signal, control data, and data of an input image to a source driver IC during the pixel driving period and transmit the preamble signal to the source driver IC during the touch sensor driving period.

The pixels are held at a last data voltage charged during the pixel driving period, or a specific voltage during the touch sensor driving period.

In another aspect, there is a method for driving a display device, in which pixels of a display panel are charged to a data voltage during a pixel driving period and touch sensors embedded in the display panel are driven during a touch sensor driving period, the method comprising transmitting a preamble signal, control data, and data of an input image to a source driver IC during the pixel driving period and transmitting the preamble signal to the source driver IC during the touch sensor driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an exemplary embodiment of the invention may be implemented based on a flat panel display, such as a liquid crystal display (LCD), an organic light emitting display, an electrophoresis display (EPD), and a plasma display panel (PDP). In the following description, the embodiment of the invention will be described using the liquid crystal display as an example of the flat panel display. Other flat panel displays may be used.

Figure 2:
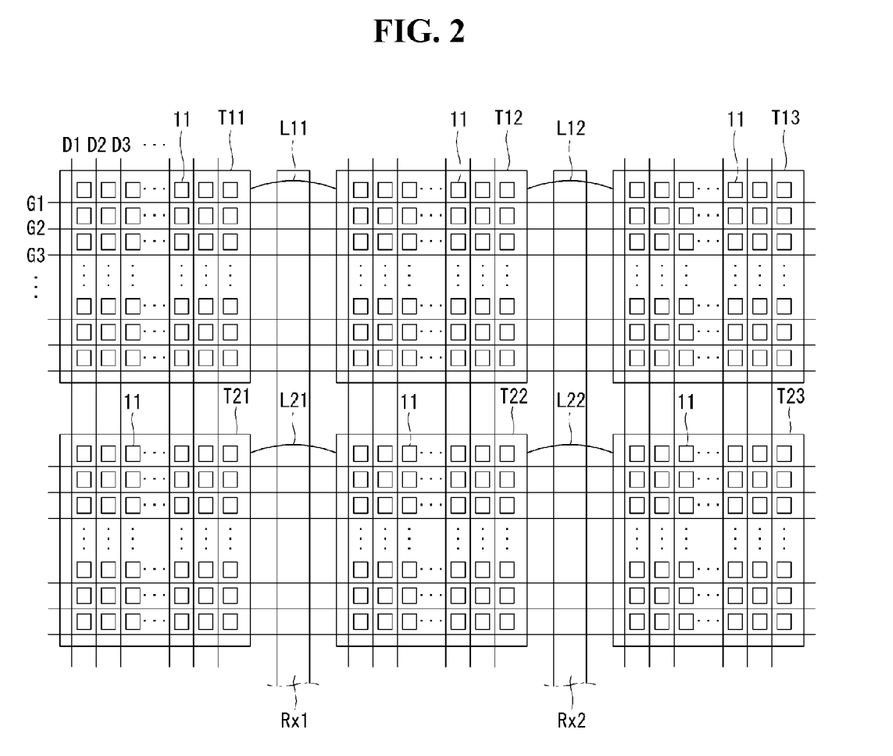
FIG. 2 shows an example of touch sensors embedded in a pixel array.
Figure 3:
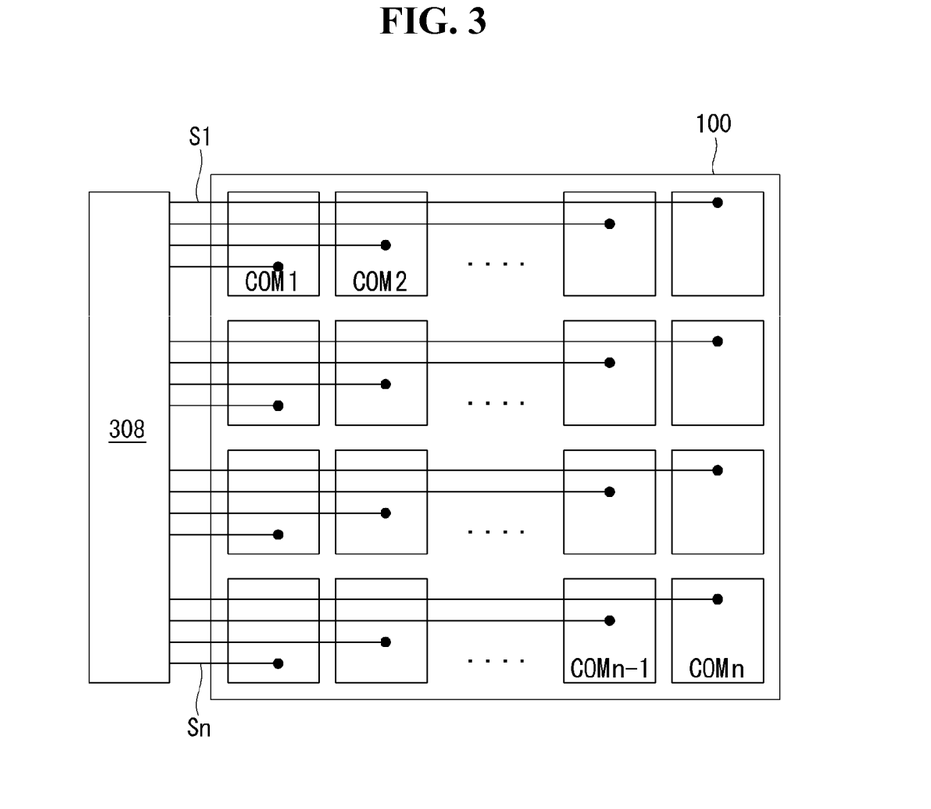
FIG. 3 shows another example of touch sensors embedded in a pixel array.

Touch sensors according to the embodiment of the invention are embedded in a pixel array. The touch sensors may be implemented as capacitive touch sensors which sense a touch input based on changes in a capacitance before and after a touch operation. The capacitive touch sensors may be classified into mutual capacitive touch sensors and self capacitive touch sensors. As shown in FIG. 2, the mutual capacitive touch sensor is formed between two conductor lines perpendicular to each other. As shown in FIG. 3, the self capacitive touch sensor is formed along conductor lines of a single layer formed in one direction.

Figure 1:
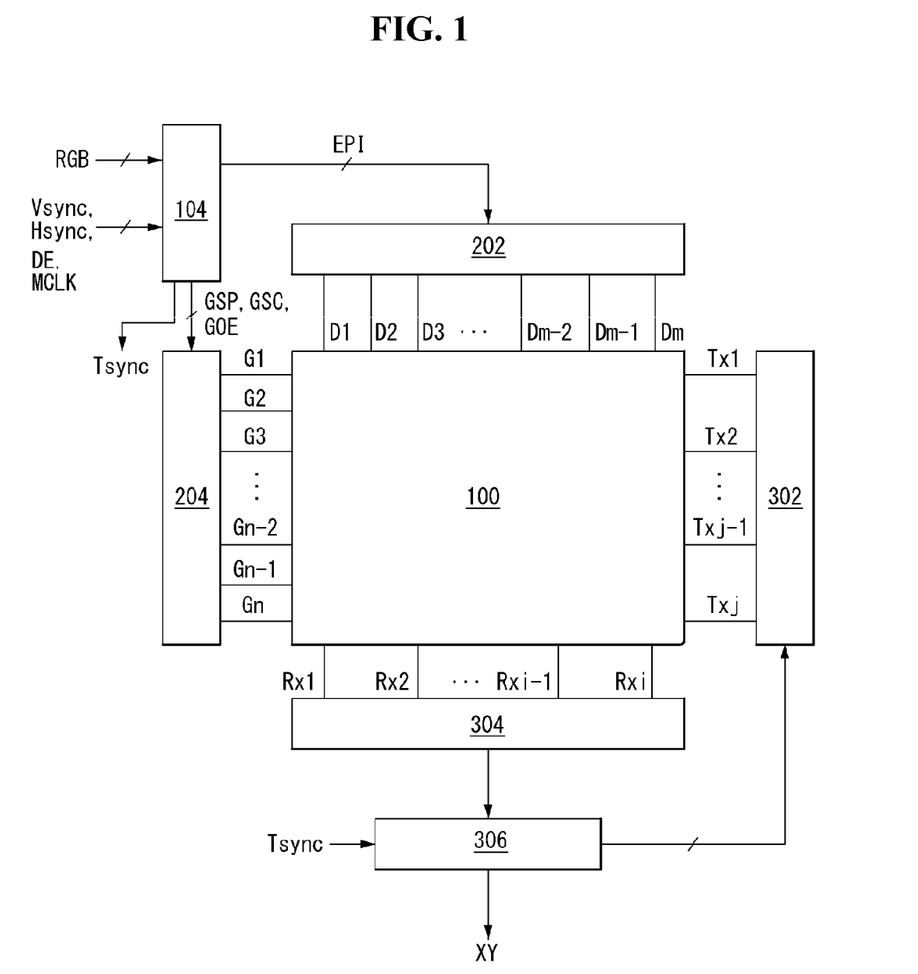
FIG. 1 is a block diagram of a display device according to an exemplary embodiment of the invention.

As shown in FIGS. 1 and 2, a touch sensor embedded display device according to the embodiment of the invention includes a display panel 100, display driving circuits 202, 204, and 104, touch sensor driving circuits 302, 304, and 306, and the like.

A thin film transistor (TFT) array substrate of the display panel 100 includes a plurality of data lines D1 to Dm (where m is a positive integer), a plurality of gate lines G1 to Gn (where n is a positive integer) crossing the data lines D1 to Dm, a plurality of TFTs formed at crossings of the data lines D1 to Dm and the gate lines G1 to Gn, a plurality of pixel electrodes 11 which are connected to the data lines D1 to Dm through the TFTs and are charged to a data voltage, a plurality of common electrodes to which a common voltage Vcom is supplied, a plurality of touch sensors, and the like. The TFT array substrate further includes storage capacitors (not shown). The storage capacitor is connected to the pixel electrode 11 and holds a voltage of a liquid crystal cell.

Figure 4:
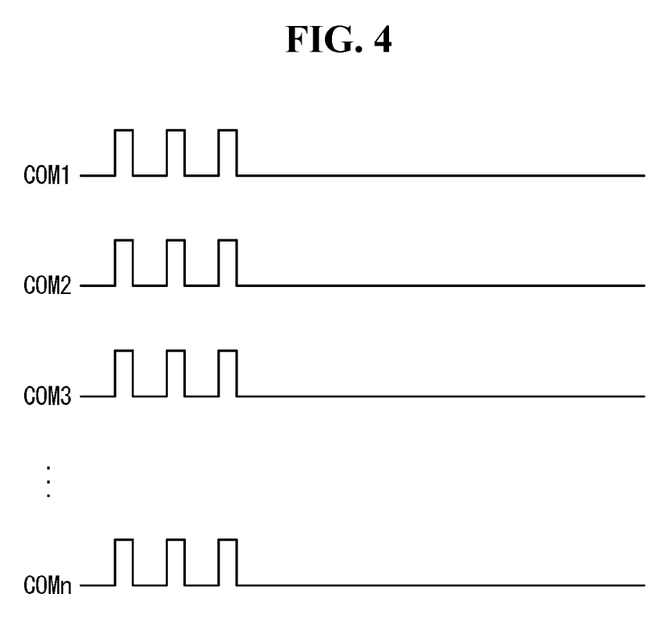
FIG. 4 is a waveform diagram to operate a touch sensor shown in FIG. 3.
Figure 5:
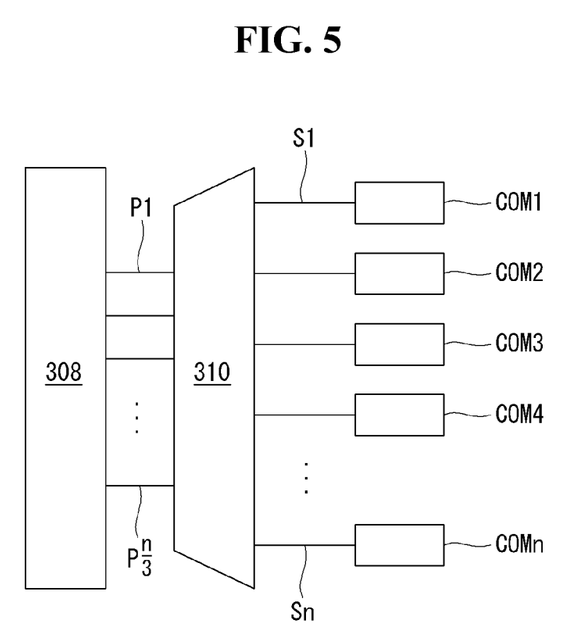
FIG. 5 shows a multiplexer formed between a touch sensor driving circuit and touch sensors.

The touch sensors according to the embodiment of the invention may be implemented as mutual capacitive touch sensors as shown in FIG. 2, or may be implemented as self capacitive touch sensors as shown in FIGS. 3 to 5. The mutual capacitive touch sensors include Tx lines Tx1 to Txj (where T is a positive integer less than n), Rx lines Rx1 to Rxi (where 'i' is a positive integer less than m), mutual capacitances formed at crossings of the Tx lines Tx1 to Txj and the Rx lines Rx1 to Rxi, and the like.

Figure 6:
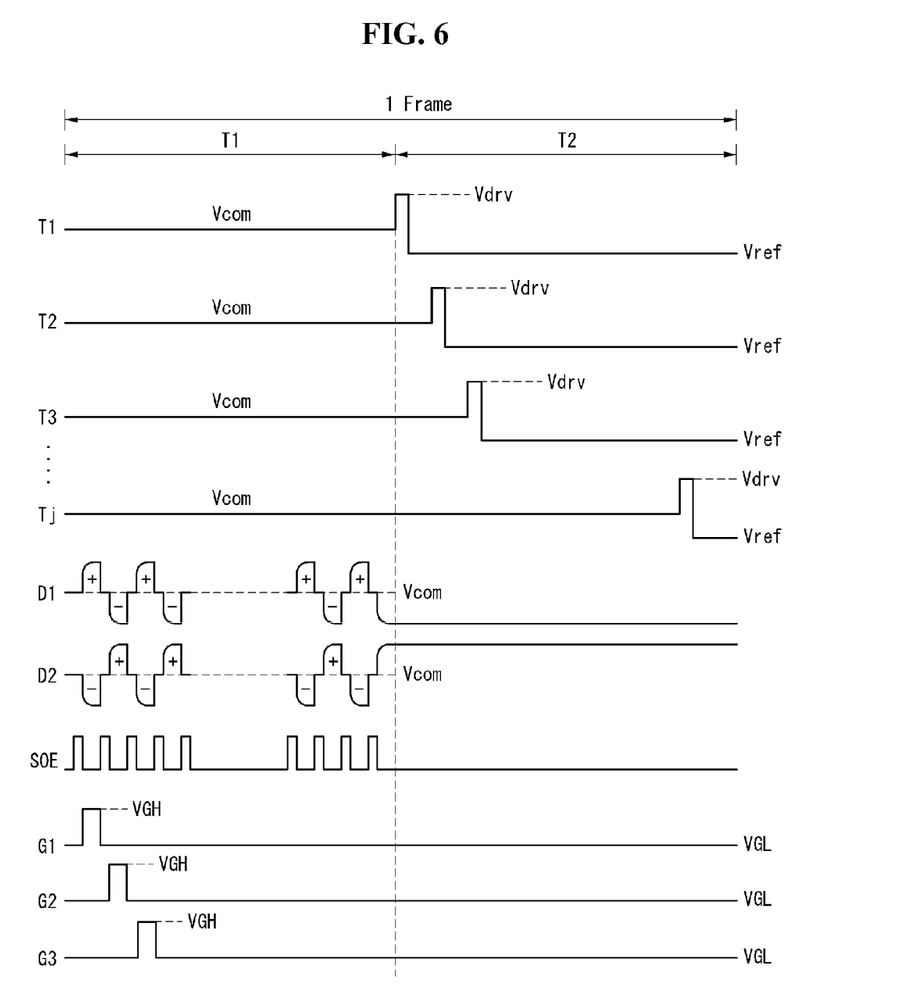
FIGS. 6 and 7 are waveform diagrams showing examples of a time division driving method of a pixel driving period and a touch sensor driving period.
Figure 7:
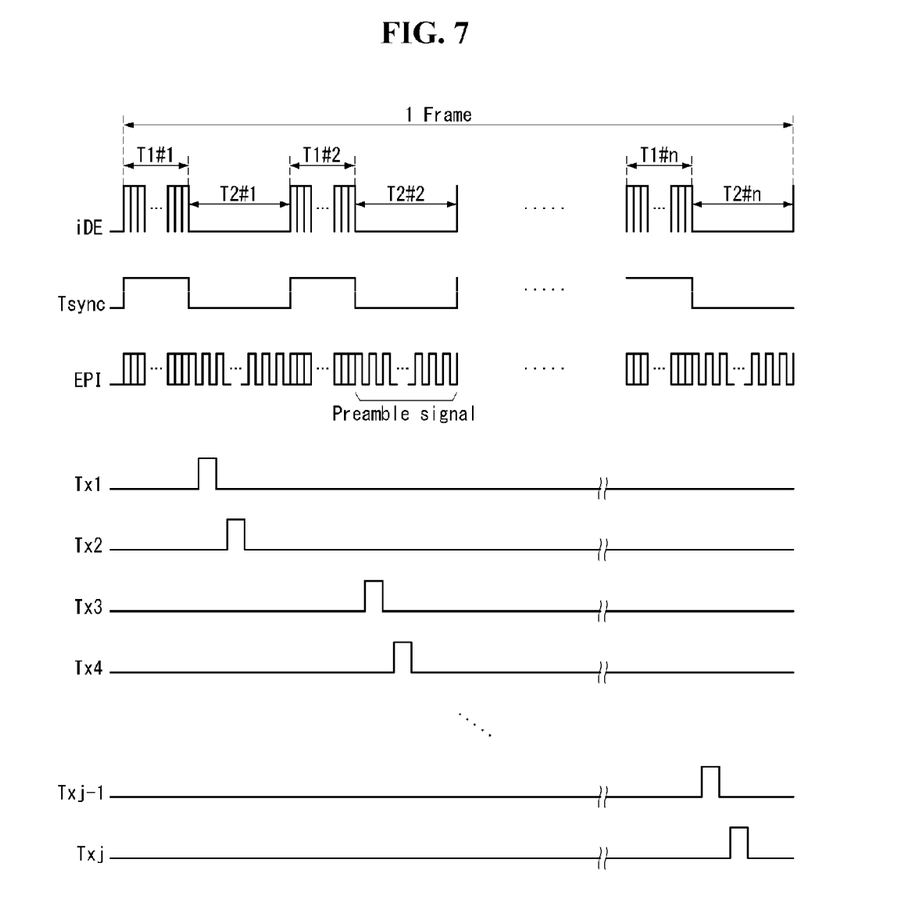

The Tx lines Tx1 to Txj and the Rx lines Rx1 to Rxi are connected to the common electrodes and supply the common voltage Vcom to the common electrodes during a pixel driving period T1 (refer to FIGS. 6 and 7). During a touch sensor driving period T2 (refer to FIGS. 6 and 7), a driving signal for driving the touch sensors is supplied to the Tx lines Tx1 to Txj, and the Rx lines Rx1 to Rxi receive an output of the touch sensors in synchronization with the driving signal.

An input image is displayed on a pixel array of the display panel 100. Pixels of the pixel array are formed in pixel areas defined by the data lines D1 to Dm and the gate lines G1 to Gn in a matrix form. Each pixel is driven by an electric field applied depending on a voltage difference between the data voltage applied to the pixel electrode 11 and the common voltage Vcom applied to the common electrode, thereby adjusting a transmission amount of incident light. The TFTs are turned on in response to a gate pulse from the gate lines G1 to Gn and thus supply a voltage from the data lines D1 to Dm to the pixel electrodes 11 of the liquid crystal cells. The common electrodes receive the common voltage Vcom during the pixel driving period T1 and form a reference potential of the pixels. The common electrode is divided as shown in FIGS. 2 and 5 and is used as an electrode of the touch sensor during the touch sensor driving period T2.

Black matrixes, color filters, etc. are formed on a color filter substrate of the display panel 100. Polarizing plates are respectively attached to the TFT array substrate and the color filter substrate of the display panel 100. Alignment layers for setting a pre-tilt angle of liquid crystals are respectively formed on the inner surfaces contacting the liquid crystals in the TFT array substrate and the color filter substrate of the display panel 100. A column spacer is formed on a liquid crystal layer of the display panel 100 to keep cell gaps of the liquid crystal cells constant.

The display driving circuits 202, 204, and 104 apply data to the pixels. The display driving circuits 202, 204, and 104 include a data driving circuit 202, a gate driving circuit 204, and a timing controller 104.

The data driving circuit 202 includes a plurality of source driver integrated circuits (ICs) SDIC. The source driver ICs SDIC are connected to the timing controller 104 through EPI (clock embedded point-to-point) line pairs in a point-to-point manner. The source driver ICs SDIC output an analog video data voltage during the pixel driving period T1.

The source driver ICs SDIC sample and latch digital video data RGB received from the timing controller 104 through the EPI line pairs during the pixel driving period T1. The source driver ICs SDIC convert the digital video data RGB into positive and negative analog gamma compensation voltages and output the positive and negative data voltages during the pixel driving period T1. The positive and negative data voltages (+/−) (refer to FIG. 6) are supplied to the data lines D1 to Dm.

Figure 13:
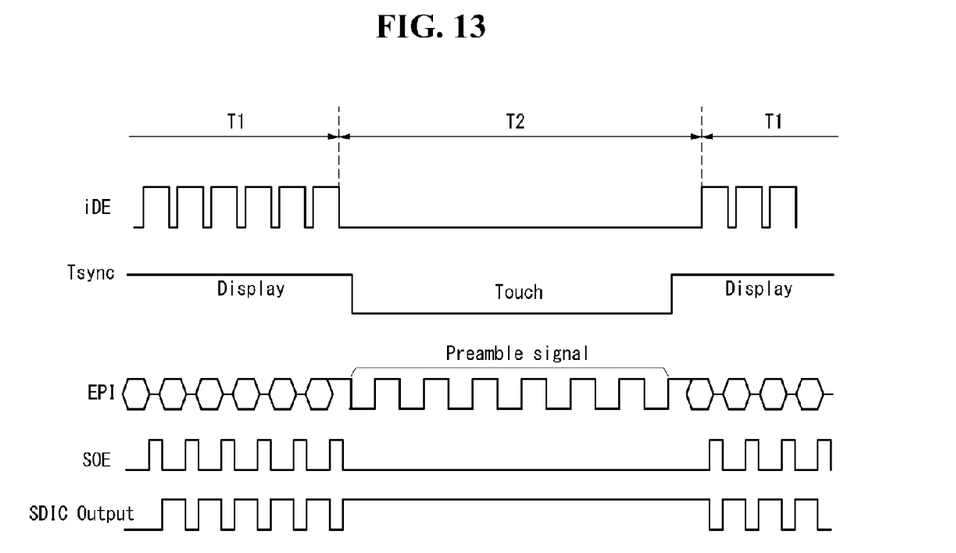
FIGS. 13 and 14 are waveform diagrams showing a source output enable signal and an output of a source driver IC during a touch sensor driving period.
Figure 14:
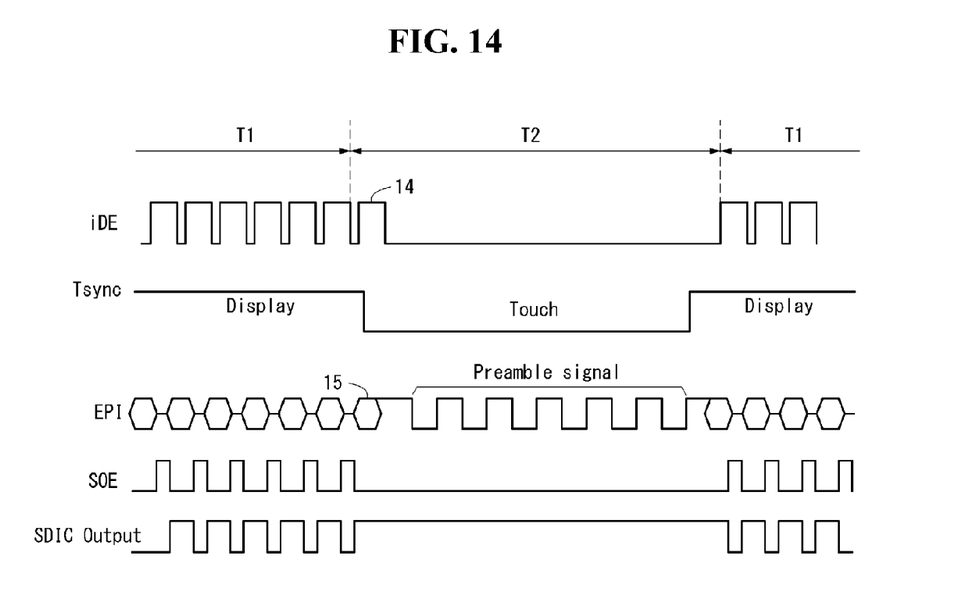

As shown in FIGS. 13 and 14, the source driver ICs SDIC generate a source output enable signal SOE at a first logic level (e.g., a low level) when control data is not received from the timing controller 104. The source driver ICs SDIC output the data voltage during a low logic period of the source output enable signal SOE. On the other hand, the source driver ICs SDIC do not output the data voltage and perform the charge sharing during a second logic period (e.g., high level) of the source output enable signal SOE.

In one implementation, during the touch sensor driving period T2, output channels of the source driver ICs SDIC may be held at the last data voltage output during the pixel driving period T1. Because during the touch sensor driving period T2 the pixels are held at the last data voltage charged during the pixel driving period T1, the voltage charged to the touch sensors are maintained at the same level.

The source driver ICs SDIC may supply all of the data lines D1 to Dm with a specific voltage generated by converting digital data of a specific gray level, which is input in an initial period of the touch sensor driving period T2, into a gamma compensation voltage. In this instance, because the specific voltage of the same potential is applied to all of the data lines D1 to Dm, the data lines D1 to Dm are held at the same potential during the touch sensor driving period T2. Because there is no deviation between the voltage levels of the data lines D1 to Dm when the data lines D1 to Dm have the same potential, immunity of the touch sensors against noise may further improve. Because the gate pulse is not generated during the touch sensor driving period T2, the pixels are held at the last data voltage charged during the pixel driving period T1, even if the specific voltage is applied to the data lines D1 to Dm. Thus, the pixels do not generate changes in the voltage charged to the touch sensors during the touch sensor driving period T2.

In another approach, the source driver ICs SDIC may place the output channels in a high impedance state under the control of the timing controller 104 during the touch sensor driving period T2. When the output channels of the source driver ICs SDIC are placed in the high impedance state, the output channels of the source driver ICs SDIC are not connected to the data lines D1 to Dm. In this instance, the pixels are held at the last data voltage or the specific voltage during the touch sensor driving period T2.

The output of the source driver ICs SDIC during the pixel driving period T1 may be controlled depending on option information encoded to the control data of the timing controller 104. Thus, the pixels do not generate changes in the voltage charged to the touch sensors during the touch sensor driving period T2.

The source driver ICs SDIC perform the clock training in response to a preamble signal received from the timing controller 104 during the touch sensor driving period T2.

The gate driving circuit 204 generates a gate pulse (or a scan pulse) synchronized with the data voltage, and sequentially supplies the gate pulse to the gate lines G1 to Gn under the control of the timing controller 104 during the pixel driving period T1. A gate pulse supplied to a gate line Gi from the gate lines G1 to Gn is shifted from a gate pulse supplied to a gate line preceding the gate line Gi. The gate driving circuit 204 is known as a scan driving circuit. The gate driving circuit 204 includes at least one gate driver IC. The gate driver IC sequentially supplies the gate pulse synchronized with the data voltage to the gate lines G1 to Gn under the control of the timing controller 104 and selects lines of the display panel 100, to which data of the input image is applied, during the pixel driving period T1. The gate pulse swings between a gate high voltage VGH and a gate low voltage VGL as shown in FIG. 6.

The gate driving circuit 204 does not generate the gate pulse during the touch sensor driving period T2. In one example, the gate driving circuit 204 supplies the gate low voltage VGL to the gate lines G1 to Gn during the touch sensor driving period T2. Instead, the gate lines G1 to Gn supply the gate pulse to the TFTs of the pixels and sequentially select lines of the display panel 100, to which the data of the input image is applied, during the pixel driving period T1. Further, the gate lines G1 to Gn are held at the gate low voltage VGL and prevents changes in the output of the touch sensors during the touch sensor driving period T2.

The timing controller 104 encodes source control data for controlling operation timing of the data driving circuit 202 using timing signals, such as a vertical sync signal Vsync, a horizontal sync signal Hsync, a data enable signal DE, and a main clock MCLK, received from an external host system. The timing controller 104 transmits the source control data to the source driver ICs SDIC through the EPI line pairs.

Further, the timing controller 104 transmits a timing control signal for controlling operation timing of the gate driving circuit 204 to the gate driving circuit 204 using the timing signals received from the host system. The timing control signal of the gate driving circuit 204 includes a gate start pulse GSP, a gate shift clock GSC, a gate output enable signal GOE, and the like. The source control data includes a polarity control signal POL, a source output enable signal SOE, option information for controlling output channels of the source driver ICs SDIC, and the like.

The timing controller 104 compresses an external data enable signal received from the host system within the previously set pixel driving period T1 and generates an internal data enable signal iDE. The timing controller 104 generates a divided vertical sync signal Tsync for time-dividing one frame period into at least one pixel driving period T1 and at least one touch sensor driving period T2 in conformity with the timing of the vertical sync signal Vsync and the internal data enable signal iDE. The timing controller 104 transmits the divided vertical sync signal Tsync to a touch controller and synchronizes operations of the display driving circuits 202, 204, and 104 with operations of the touch sensor driving circuits 302, 304, and 306.

If the internal data enable signal iDE is not generated for a predetermined period of time, the timing controller 104 transmits the preamble signal to the source driver ICs SDIC. If the internal data enable signal iDE is generated, the timing controller 104 transmits the preamble signal, the control data, and the data of the input image to the source driver ICs SDIC.

The timing controller 104 sequentially transmits the preamble signal, the control data and the digital video data RGB of the input image to the source driver ICs SDIC based on an EPI interface protocol during the pixel driving period T1. Because there are no pulses in the internal data enable signal iDE during the touch sensor driving period T2, the timing controller 104 transmits the preamble signal for the clock training of the source driver ICs SDIC to the source driver ICs SDIC during the touch sensor driving period T2.

The host system converts the digital video data RGB of the input image into a data format suitable to be displayed on the display panel 100. The host system transmits the digital video data RGB of the input image and the timing signals Vsync, Hsync, DE, and MCLK to the timing controller 104.

The host system may be implemented as one of a television system, a set-top box, a navigation system, a DVD player, a Blu-ray player, a personal computer (PC), a home theater system, and a phone system, and receives the input image. The host system runs an application associated with touch input coordinates received from the touch controller 306.

The mutual capacitive touch sensors having an electrode structure shown in FIG. 2 may be embedded in the pixel array. The Tx lines Tx1 to Txj include common electrode division patterns T11 to T23 and link patterns L11 to L22. The first Tx line Tx1 includes the plurality of common electrode division patterns T11 to T13 which are connected along a transverse direction via the link patterns L11 and L12. The second Tx line Tx2 includes the plurality of common electrode division patterns T21 to T23 which are connected along the transverse direction via the link patterns L21 and L22. The size of each of the common electrode division patterns T11 to T23 is patterned to be larger than the pixel size, so that each common electrode division pattern includes two or more pixel areas. Each of the common electrode division patterns T11 to T23 may be formed of a transparent conductive material such as indium tin oxide (ITO). The link patterns L11 to L22 electrically connect the common electrode division patterns T11 to T23 which are adjacent to each other in the transverse direction (or a horizontal direction). The mutual capacitive touch sensors may have structures other than the structure shown in FIG. 2. For example, the mutual capacitive touch sensors embedded in the pixel array may be manufactured using the structure disclosed in U.S. Patent Application Publication No. 2014/0160066 corresponding to the present applicant, and which are hereby incorporated by reference in their entirety.

The touch sensor driving circuits 302, 304, and 306 drive the touch sensors and sense the touch input of the touch sensors during the touch sensor driving period T2. The touch sensor driving circuits 302, 304, and 306 include a driving circuit 302, a sensing circuit 304, and a touch controller 306.

The driving circuit 302 supplies the common voltage Vcom to the Tx lines Tx1 to Txj during the pixel driving period T1 and supplies a driving signal to the Tx lines Tx1 to Txj during the touch sensor driving period T2. The driving signal swings between a touch driving voltage Vdry and a reference voltage Vref.

The sensing circuit 304 supplies the common voltage Vcom to the Rx lines Rx1 to Rxi during the pixel driving period T1 and receives the voltage of the touch sensors during the touch sensor driving period T2. The sensing circuit 304 amplifies an analog output of the touch sensors received through the Rx lines Rx1 to Rxi and converts the amplified analog output into digital data. The sensing circuit 304 then generates touch raw data.

The touch controller 306 analyzes the touch raw data received from the sensing circuit 304 using a predetermined touch recognition algorithm. In one aspect, the touch controller 306 compares the touch raw data with a predetermined threshold voltage for detecting a touch. For example, the touch controller 306 uses the touch raw data equal to or greater than a predetermined threshold voltage as touch input data and calculates the touch input position (e.g., coordinates XY) of the touch input data. Information on the coordinates XY of the touch input position output from the touch controller 306 is transmitted to the host system.

FIGS. 3 to 5 show the self capacitive touch sensors and a method for driving the same.

As shown in FIGS. 3 to 5, the self capacitive touch sensors include common electrode division patterns COM1 to COMn. Each of the common electrode division patterns COM1 to COMn may be formed of indium tin oxide (ITO) and may be patterned to be larger than the pixel.

A driving circuit 308 may be individually connected to the common electrode division patterns COM1 to COMn through sensing lines S1 to Sn. The driving circuit 308 supplies the common voltage Vcom to the common electrode division patterns COM1 to COMn during the pixel driving period T1. The driving circuit 308 supplies a driving signal shown in FIG. 4 to the sensing lines S1 to Sn during the touch sensor driving period T2 and senses changes in capacitances of the touch sensors. The driving circuit 308 then outputs touch raw data. The touch controller (not shown) analyzes the touch raw data received from the driving circuit 308, calculates coordinates of a touch input position, and transmits information on the coordinates of the touch input position output to the host system.

As shown in FIG. 5, a multiplexer 310 may be installed between the driving circuit 308 and the sensing lines S1 to Sn, so as to reduce the number of pins of the driving circuit 308. If the sensing lines S1 to Sn are divided into three groups, the multiplexer 310 connects pins P1 to Pn/3 of the driving circuit 308 to sensing lines of a first group and simultaneously supplies a driving signal to capacitive touch sensors connected to the sensing lines of the first group. Subsequently, the multiplexer 310 connects the pins P1 to Pn/3 of the driving circuit 308 to sensing lines of a second group and simultaneously supplies the driving signal to capacitive touch sensors connected to the sensing lines of the second group. Subsequently, the multiplexer 310 connects the pins P1 to Pn/3 of the driving circuit 308 to sensing lines of a third group and simultaneously supplies the driving signal to capacitive touch sensors connected to the sensing lines of the third group.

The touch sensors are driven during the touch sensor driving period T2 as shown in FIGS. 6 and 7. During the touch sensor driving period T2, the pixels are held at the last data voltage charged during the pixel driving period T1 immediately before the touch sensor driving period T2, or a specific voltage.

FIGS. 6 and 7 are waveform diagrams showing examples of a time division driving method of the pixel driving period T1 and the touch sensor driving period T2.

As shown in FIG. 6, the pixel driving period T1 and the touch sensor driving period T2 may be separated by dividing one frame period into two parts. In this instance, video data corresponding to an amount of one frame is applied to all of the pixels during the pixel driving period T1, and all of touch sensor lines are driven during the touch sensor driving period T2.

As shown in FIG. 7, each of the pixel driving period T1 and the touch sensor driving period T2 may be divided into n parts, where n is a positive integer equal to or greater than 2. In one approach, each divided pixel driving period T1 is followed by its corresponding divided pixel driving period T2.

When the pixels are divided into n groups (where n is a positive integer which is equal to or greater than 2 and is less than j/2), each of the pixel driving periods T1#1 to T1#n is set to a time required to drive one pixel group. When the touch sensors are divided into n groups, each of the touch sensor driving periods T2#1 to T2#n is set to a time required to drive one touch sensor group. In an example shown in FIG. 7, one touch sensor group includes the touch sensors connected to the two Tx lines.

As shown in FIG. 7, video data is applied to pixels of a first pixel group during a first pixel driving period T1#1, and then touch sensors of a first touch sensor group are driven during a first touch sensor driving period T2#1. Subsequently, video data is applied to pixels of a second pixel group during a second pixel driving period T1#2, and then touch sensors of a second touch sensor group are driven during a second touch sensor driving period T2#2.

Figure 8:
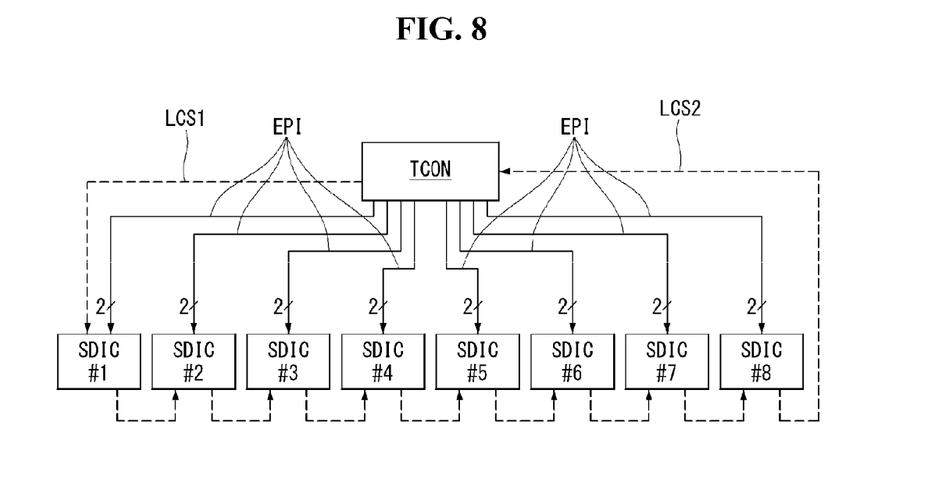
FIG. 8 shows EPI lines connected between a timing controller and source driver integrated circuits (ICs)
Figure 9:
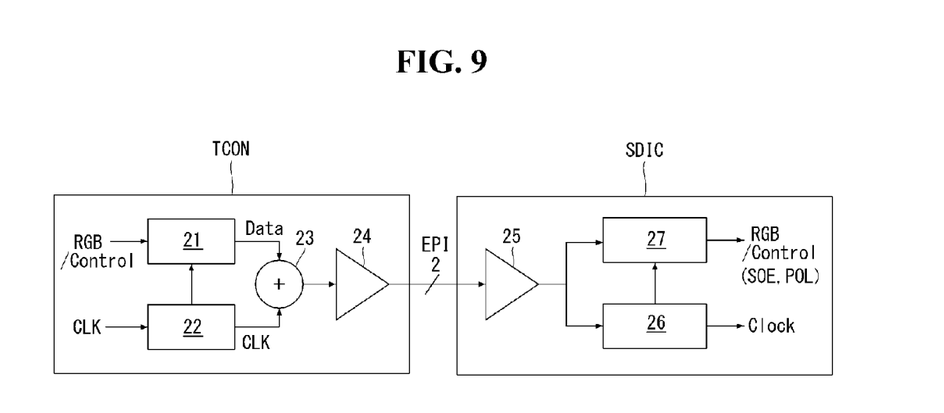
FIG. 9 shows a timing controller and a clock recovery circuit of a source driver IC shown in FIG. 8.
Figure 10:
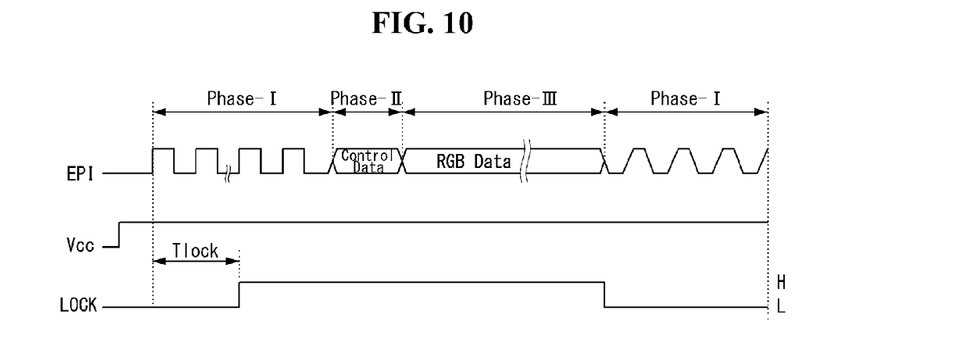
FIG. 10 is a waveform diagram showing an EPI interface protocol for signal transmission between a timing controller and source driver ICs shown in FIG. 9.
Figure 11:
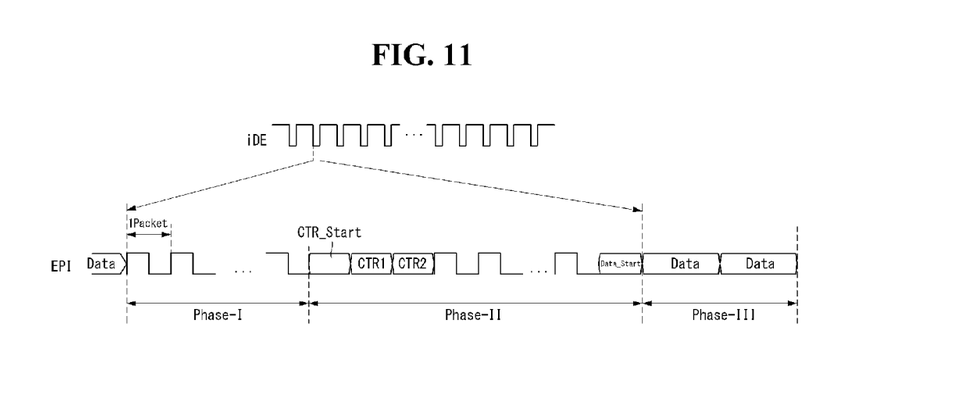
FIG. 11 is a waveform diagram showing an EPI interface signal transmitted to source driver ICs during a horizontal blank period.

FIG. 8 shows EPI lines EPI connecting a timing controller TCON and source driver ICs SDIC. FIG. 9 shows the timing controller TCON and a clock recovery circuit of the source driver IC SDIC. FIG. 10 is a waveform diagram showing the EPI interface protocol for signal transmission between the timing controller TCON and the source driver ICs SDIC. FIG. 11 is a waveform diagram showing an EPI interface signal transmitted to the source driver ICs SDIC during a horizontal blank period.

In FIG. 8, the solid line denotes EPI line pairs EPI, to which signals including the preamble signal, the control data, the video data of the input image, etc. are transmitted. The dotted line denotes lock lines LCS1 and LCS2, to which a lock signal LOCK is transmitted.

As an example, the timing controller TCON is connected to each of the source driver ICs SDIC#1 to SDIC#8 through the EPI line pairs EPI.

The timing controller TCON sequentially transmits the EPI signals including the preamble signal, the control data, and the video data of the input image in the order named to the source driver ICs SDIC#1 to SDIC#8 through the EPI line pairs EPI during the pixel driving period T1. A control data packet is transmitted to bit stream including clock bit, control start bit CTR_Start, source control data, gate control data, etc. A video data packet is transmitted to a bit stream including clock bit, internal data enable bit, RGB data bit, etc. Each of the source driver ICs SDIC#1 to SDIC#8 recovers an internal clock signal input through the EPI line pair EPI.

In a first stage Phase-I, the timing controller TCON transmits a lock start signal to the first source driver IC SDIC#1 through the lock line LCS1 and transmits the preamble signal for clock training to the source driver ICs SDIC#1 to SDIC#8 through the EPI line pairs EPI. The first source driver IC SDIC#1 generates a lock signal LOCK when a phase and a frequency of the internal clock are locked and a CRD (clock and data recovery) function is stabilized, and transmits the lock signal LOCK to the second source driver IC SDIC#2. Each of the source driver ICs SDIC#2 to SDIC#8 sequentially generates an internal clock through the clock training based on the lock signal LOCK and the preamble signal from a previous source driver IC. Each of the source driver ICs SDIC#2 to SDIC#7 transmits the lock signal LOCK to a next source driver IC when a phase and a frequency of the internal clock are locked and a CDR (clock and data recovery) function of the corresponding source driver IC is stabilized. When the CDR functions of all of the source driver ICs SDIC#1 to SDIC#8 are stabilized, the last source driver IC SDIC#8 transmits the lock signal LOCK of the high logic level to the timing controller TCON through the lock feedback signal line LCS2. A lock signal output terminal of the previous source driver IC is not connected to a lock signal input terminal of the first source driver IC SDIC#1. Instead, in one example, a DC power voltage Vcc of a high logic level is input to the lock signal input terminal of the first source driver IC SDIC#1.

After the timing controller TCON receives the lock signal LOCK of the high logic level from the last source driver IC SDIC#8, the timing controller TCON transmits the control data and the video data to each of the source driver ICs SDIC#1 to SDIC#8 in second and third stages Phase-II and Phase-III. The control data includes source control data for controlling output timing, a polarity, etc. of the data voltage output from the source driver ICs SDIC#1 to SDIC#8. The control data may include gate control data for controlling operating timing of the gate driver IC.

The timing controller TCON receives the digital video data RGB of the input image from the host system through an interface receiving circuit 21. The timing controller TCON generates the control data including the source control data and the gate control data based on an external timing signal input from the host system using an internal timing control signal generating circuit 22. An encoder 23 embeds clocks CLK in a data packet in conformity with a format determined in the EPI interface protocol. An output of the encoder 23 is converted into differential signal pair through a transmitting buffer 24 and is transmitted to the source driver ICs SDIC#1 to SDIC#8.

A receiving buffer 25 of the source driver IC SDIC receives an EPI signal from the timing controller TCON through the EPI line pair EPI. A clock recovery circuit 26 of the source driver IC SDIC recovers the received clock and generates an internal clock. A sampling circuit 27 of the source driver IC SDIC samples bits of the control data and bits of the digital video data of the input image in conformity with internal clock timing.

In FIG. 10, "Tlock" is a time between the preamble signal starts to be transmitted to the source driver ICs SDIC#1 to SDIC#8 and outputs of the clock recovery circuits of the source driver ICs SDIC#1 to SDIC#8 are stably locked and the lock signal LOCK is inverted to a high logic level H.

In the EPI interface protocol, 1 data packet transmitted to the source driver ICs SDIC#1 to SDIC#8 includes a plurality of data bits and clock bits assigned before and after the data bits. The data bits are bits of the control data or bits of the digital video data of the input image.

In the EPI interface protocol, the signal in the first stage Phase-I, the signal in the second stage Phase-II, and the signal in the third stage Phase-III are transmitted to the source driver ICs SDIC#1 to SDIC#8 in each horizontal blank period between pulses of the internal data enable signal iDE.

Each of the source driver ICs SDIC#1 to SDIC#8 supplies the positive and negative data voltages to k data lines D1 to Dk, where k is a positive integer equal to or greater than 2.

Figure 12:
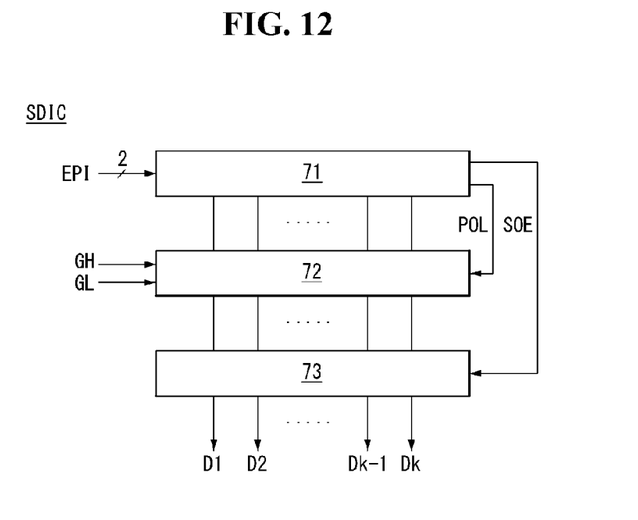
FIG. 12 is a block diagram showing an internal circuit configuration of a source driver IC.

As shown in FIG. 12, each of the source driver ICs SDIC#1 to SDIC#8 includes a data sampling and deserializer 71, a digital-to-analog converter (DAC) 72, an output circuit 73, and the like.

The data sampling and deserializer 71 includes the receiving buffer 25, the clock recovery circuit 26, and the sampling circuit 27. The data sampling and deserializer 71 outputs the internal clocks using the clock recovery circuit 26 and samples the bits of the digital video data RGB of the input image received through the EPI line pair EPI in response to the internal clocks. The data sampling and deserializer 71 latches the sampled data bits and then outputs simultaneously the data bits. Hence, the data bits are converted into parallel data.

The data sampling and deserializer 71 recovers the control data received through the EPI line pair EPI in a code mapping manner and generates the source control data. When the gate control data is encoded to the control data, the data sampling and deserializer 71 recovers the gate control data from the control data received through the EPI line pair EPI and transmits the recovered gate control data to the gate driver IC. The source control data may include the source output enable signal SOE, the polarity control signal POL, the option information, and the like. The polarity control signal POL indicates polarities of the positive and negative analog data voltages supplied to the data lines D1 to Dk. The source control data and the gate control data are encoded by the timing controller TCON and are transmitted to the source driver ICs SDIC#1 to SDIC#8 through the EPI line pair EPI in the second stage Phase-II. In the EPI interface protocol, an encoding method and a recovery method of the control data are disclosed in U.S. Pat. No. 7,948,465 corresponding to the present applicant, which is hereby incorporated by reference in their entirety.

The DAC 72 converts the video data received from the data sampling and deserializer 71 into a positive gamma compensation voltage GH and a negative gamma compensation voltage GL and generates the positive and negative analog data voltages. The DAC 72 inverts the polarity of the data voltage in response to the polarity control signal POL.

The output circuit 73 does not output the data voltage during a high logic period of the source output enable signal SOE and supplies an average voltage of the positive data voltage and the negative data voltage to the data lines D1 to Dk through the charge sharing. During a period of the charge sharing, output channels of the source driver ICs SDIC#1 to SDIC#8, to which the positive data voltage is supplied, and output channels of the source driver ICs SDIC#1 to SDIC#8, to which the negative data voltage is supplied, are short-circuited, and thus the average voltage of the positive data voltage and the negative data voltage is supplied to the data lines D1 to Dk. The output circuit 73 supplies the positive and negative data voltages to the data lines D1 to Dk through an output buffer during a low logic period of the source output enable signal SOE. Thus, the source driver ICs SDIC#1 to SDIC#8 output the data voltage during the low logic period of the source output enable signal SOE and invert the polarity of the data voltage in response to the polarity control signal POL.

FIGS. 13 and 14 are waveform diagrams showing the source output enable signal SOE and an output of the source driver IC SDIC during the touch sensor driving period.

As shown in FIG. 13, during the pixel driving period T1, the source driver ICs SDIC#1 to SDIC#8 recover the control data received from the timing controller TCON and generate the source output enable signal SOE, of which a logic level is inverted in each horizontal period.

During the touch sensor driving period T2, the source driver ICs SDIC#1 to SDIC#8 hold the source output enable signal SOE at the low logic level because the control data is not received from the timing controller TCON, and holds the voltage of the output channels of the source driver ICs SDIC#1 to SDIC#8 at the last data voltage charged in the pixel driving period T1.

During the touch sensor driving period T2, the timing controller TCON transmits the preamble signal to the source driver ICs SDIC#1 to SDIC#8 and does not transmit the control data and the digital video data of the input image to the source driver ICs SDIC#1 to SDIC#8. Namely, the EPI interface holds the first stage Phase-I irrespective of the logic level of the lock signal LOCK feedbacked to the timing controller TCON during the touch sensor driving period T2. Thus, during the touch sensor driving period T2, the source driver ICs SDIC#1 to SDIC#8 continuously perform the clock training and maintain the last data voltage of the pixel driving period T1.

As shown in FIG. 14, during the pixel driving period T1, the source driver ICs SDIC#1 to SDIC#8 recover the control data received from the timing controller TCON and generate the source output enable signal SOE, of which a logic level is inverted in each horizontal period.

The timing controller TCON additionally generates a dummy data enable pulse 14 in an initial period of the touch sensor driving period T2. The timing controller TCON transmits data of a specific gray level to the source driver ICs SDIC#1 to SDIC#8 in synchronization with the dummy data enable pulse 14 through the EPI line pair EPI, and then transmits the preamble signal to the source driver ICs SDIC#1 to SDIC#8 during the touch sensor driving period T2. The data of the specific gray level is data previously stored in a register of the timing controller TCON irrespective of the input image. The data of the specific gray level is encoded inside a dummy data packet 15 additionally generated in the initial period of the touch sensor driving period T2 and is transmitted to the source driver ICs SDIC#1 to SDIC#8.

The source driver ICs SDIC#1 to SDIC#8 convert the data of the specific gray level received in the initial period of the touch sensor driving period T2 into the gamma compensation voltage and output a specific voltage. The source driver ICs SDIC#1 to SDIC#8 hold the source output enable signal SOE at the low logic level during the touch sensor driving period T2 and hold the voltage of the output channel at the specific voltage. Because the gate pulse is not generated, the pixels are held at the last data voltage of the pixel driving period T1 during the touch sensor driving period T2 even if the specific voltage is applied to the data lines.

After the source driver ICs SDIC#1 to SDIC#8 output the specific voltage, the source driver ICs SDIC#1 to SDIC#8 continuously perform the clock training in response to the preamble signal during a remaining period of the touch sensor driving period T2.

As described above, the embodiment of the invention defines the method for holding the voltage of the pixel at the DC voltage during the touch sensor driving period in the EPI interface protocol, thereby preventing changes in the voltage of the pixel in the touch sensor driving period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, in which pixels of a display panel are charged to data voltages during a pixel driving period for displaying an image and touch sensors embedded in the display panel are driven during a touch sensor driving period for sensing a touch on the display panel, the display device comprising:
    a timing controller configured to transmit a preamble signal, control data, and data of the image to a source driver integrated circuit (IC) through one or more signal lines during the pixel driving period and transmit the preamble signal to the source driver IC through the one or more signal lines during the touch sensor driving period that is non-overlapping with the pixel driving period,
    wherein the source driver IC is configured to:
        (i) charge, during the pixel driving period, the pixels of the display panel to the data voltages for displaying the image based on the data of the image, and
        (ii) cause, during the touch sensor driving period, voltages of the pixels to be at the data voltages before transition from the pixel driving period to the touch sensor driving period, and
    wherein the source driver IC continuously performs clock training for generating an internal clock in response to the preamble signal during the touch sensor driving period, and
    wherein the preamble signal is a control signal that fixes an output phase and an output frequency of the internal clock.

2. The display device of claim 1, wherein the timing controller does not transmit the control data and the data of the image to the source driver IC during the touch sensor driving period.

3. The display device of claim 2, wherein a voltage of an output channel of the source driver IC is held, during the touch sensor driving period, at one of the data voltages before transition from the pixel driving period to the touch sensor driving period.

4. The display device of claim 3, wherein the output channel of the source driver IC supplies, during the touch sensor driving period, the one of the data voltages before transition from the pixel driving period to the touch sensor driving period to a data line coupled to one or more of the pixels.

5. The display device of claim 3, wherein the output channel of the source driver IC is not electrically connected to any data line coupled to any of the pixels during the touch sensor driving period and is held in a high impedance state during the touch sensor driving period.

6. The display device of claim 1, wherein the one or more signal lines consist of a signal line pair.

7. The display device of claim 1, wherein the data voltages before transition from the pixel driving period to the touch sensor driving period are different for at least two pixels.

8. A display device, in which pixels of a display panel are charged to data voltages during a pixel driving period for displaying an image and touch sensors embedded in the display panel are driven during a touch sensor driving period for sensing a touch on the display panel, the display device comprising:
    a timing controller configured to:
        transmit a preamble signal, control data, and data of the image to a source driver integrated circuit (IC) through one or more signal lines during the pixel driving period,
        transmit the preamble signal to the source driver IC through the one or more signal lines during the touch sensor driving period,
        generate a dummy data enable pulse during a portion of the touch sensor driving period, and
        transmit data of a specific gray level to the source driver IC in synchronization with the dummy data enable pulse,
    wherein the source driver IC is configured to:
        (i) charge, during the pixel driving period, the pixels of the display panel to the data voltages for displaying the image based on the data of the image, and
        (ii) cause, during the touch sensor driving period, voltages of the pixels to be at a voltage corresponding to the data of the specific gray level.

9. The display device of claim 8, wherein the data of the specific gray level is data previously stored in a register of the timing controller irrespective of the image, wherein the data of the specific gray level is encoded in a dummy data packet generated during the portion of the touch sensor driving period, and wherein the data of the specific gray level is transmitted to the source driver IC.

10. The display device of claim 8, wherein the one or more signal lines consist of a signal line pair.

11. A method of driving a display device, in which pixels of a display panel of the display device are charged to data voltages during a pixel driving period for displaying an image and touch sensors embedded in the display panel are driven during a touch sensor driving period for sensing a touch on the display panel, the method comprising:
    transmitting, by a timing controller, a preamble signal, control data, and data of the image to a source driver integrated circuit (IC) through one or more signal lines during the pixel driving period;

charging, by the source driver IC, the pixels of the display panel to the data voltages for displaying the image during the pixel driving period based on the data of the image;

transmitting, by the timing controller, the preamble signal to the source driver IC through the one or more signal lines during the touch sensor driving period that is non-overlapping with the pixel driving period;

holding, during the touch sensor driving period, voltages of the pixels at the data voltages before transition from the pixel driving period to the touch sensor driving period; and continuously performing, by the source driver IC, clock training for generating an internal clock in response to the preamble signal during the touch sensor driving period, wherein the preamble signal is a control signal that fixes an output phase and an output frequency of the internal clock.

12. The method of claim 11, further comprising not transmitting, by the timing controller, the control data and the data of the image to the source driver IC during the touch sensor driving period.

13. The method of claim 12, further comprising holding, during the touch sensor driving period, a voltage of an output channel of the source driver IC at one of the data voltages before transition from the pixel driving period to the touch sensor driving period.

14. The method of claim 13, further comprising supplying, by the output channel of the source driver IC, during the touch sensor driving period, the one of the data voltages to a data line coupled to one or more of the pixels.

15. The method of claim 13, further comprising:
electrically disconnecting, during the touch sensor driving period, the output channel of the source driver IC from any data line coupled to any of the pixels; and
holding, during the touch sensor driving period, the output channel of the source driver IC in a high impedance state.

16. The method of claim 11, wherein the one or more signal lines consist of a signal line pair.

17. The method of claim 11, wherein the data voltages before transition from the pixel driving period to the touch sensor driving period are different for at least two pixels.

18. A method of driving a display device, in which pixels of a display panel of the display device are charged to data voltages during a pixel driving period for displaying an image and touch sensors embedded in the display panel are driven during a touch sensor driving period for sensing a touch on the display panel, the method comprising:

transmitting, by a timing controller, a preamble signal, control data, and data of the image to a source driver integrated circuit (IC) through one or more signal lines during the pixel driving period;

charging, by the source driver IC, the pixels of the display panel to the data voltages for displaying the image during the pixel driving period based on the data of the image;

transmitting, by the timing controller, the preamble signal to the source driver IC through the one or more signal lines during the touch sensor driving period;

generating a dummy data enable pulse during a portion of the touch sensor driving period;

transmitting, by the timing controller, data of a specific gray level to the source driver IC in synchronization with the dummy data enable pulse; and holding, during the touch sensor driving period, voltages of the pixels at a voltage corresponding to the data of the specific gray level.

19. The method of claim 18, wherein the data of the specific gray level is data previously stored in a register of the timing controller irrespective of the image, the data of the specific gray level is encoded in a dummy data packet generated during the portion of the touch sensor driving period, and the data of the specific gray level is transmitted to the source driver IC.

20. The method of claim 18, wherein the one or more signal lines consist of a signal line pair.

* * * * *